(12) United States Patent  
Kodama et al.

(10) Patent No.: US 6,617,602 B2
(45) Date of Patent: Sep. 9, 2003

(54) EDGE DETECTING APPARATUS HAVING A CONTROL DEVICE WHICH SELECTIVELY OPERATES THE LIGHT EMITTING ELEMENTS

(75) Inventors: Seigo Kodama, Ama-gun (JP); Yasushi Okada, Okazaki (JP)

(73) Assignee: Fuji Machine Mfg. Co., Ltd., Chiryu (JP)

( * ) Notice: Subject to any disclaimer, the term of this patent is extended or adjusted under 35 U.S.C. 154(b) by 0 days.

(21) Appl. No.: 09/838,222

(22) Filed: Apr. 20, 2001

(65) Prior Publication Data

US 2001/0040225 A1 Nov. 15, 2001

(30) Foreign Application Priority Data

May 10, 2000 (JP) .......................................... 2000-137126

(51) Int. Cl.[7] .............................................. G01N 21/86
(52) U.S. Cl. .................. 250/559.36; 382/145; 382/146; 382/147; 356/614
(58) Field of Search ....................... 250/559.29, 559.36; 356/614, 615, 622; 382/141, 145, 147, 174, 152; 348/86, 87

(56) References Cited

U.S. PATENT DOCUMENTS 4,238,780 A * 12/1980 Doemens ............. 340/146.3 H
4,559,452 A * 12/1985 Igaki et al. .................. 250/560
5,471,310 A * 11/1995 Spigarelli et al. ........... 356/399
5,559,727 A * 9/1996 Deley et al. ................. 700/279
5,900,940 A 5/1999 Aoshima ..................... 356/375
5,926,278 A 7/1999 Asai ........................... 356/376
6,292,261 B1 * 9/2001 Fishbaine et al. ............ 356/614

FOREIGN PATENT DOCUMENTS

| DE | 41 31 365 A1 | 4/1993 |
| DE | 42 33 384 A1 | 4/1994 |
| JP | 3-99250 A | 4/1991 |
| JP | 3-99251 A | 4/1991 |
| JP | 6-291490 A | 10/1994 |

* cited by examiner

Primary Examiner—Stephone B. Allen
Assistant Examiner—Christopher W. Glass
(74) Attorney, Agent, or Firm—Oliff & Berridge, PLC

(57) ABSTRACT

A method of detecting an edge of an object, including the steps of lighting, in each one of a plurality of different directions, at least a portion of the object, taking an image of the portion of the object and a vicinity of the portion which are lighted in the each one of the different directions, synthesizing the respective images of the portion of the object taken by lighting the portion in the different directions, and detecting, based on the synthesized images, an edge of the portion of the object.

13 Claims, 8 Drawing Sheets

EDGE DETECTING APPARATUS HAVING A CONTROL DEVICE WHICH SELECTIVELY OPERATES THE LIGHT EMITTING ELEMENTS

BACKGROUND OF THE INVENTION

1. Field of the Invention

The present invention relates to a method and an apparatus for taking, with an image taking device, an image of an object and detecting an edge of the object based on image data representing the taken image.

2. Discussion of Related Art

It is widely practiced to detect a shape, a dimension, and/or a position of an object, by lighting a rear or back surface of the object and taking a silhouette image thereof. In addition, it is also practiced to light a front surface of an object and take an image of the front surface (hereinafter, referred to as "the front-surface image") of the object.

The above-mentioned silhouette-image taking method requires that a lighting device be provided in rear of the object. Thus, the degree of freedom of the image taking device is low. In addition, only an outermost shape of the object can be obtained, although in some cases other features of the object may be needed. Meanwhile, the above-mentioned front-surface-image taking method may suffer a problem that an edge of the front-surface image is unclear and accordingly a shape, a dimension, or a position of the object cannot be detected with high accuracy.

SUMMARY OF THE INVENTION

The present invention provides an edge detecting method and an edge detecting apparatus which have the following features. Those features are described, like claims, in respective paragraphs which are given respective numbers. Any feature that includes another feature shall do so by referring to the number given to the latter feature. However, the following features and the appropriate combinations thereof are just examples to which the technical features, and the combinations thereof, described in the specification are by no means limited. In addition, in the case where one feature recites a plurality of items, it is not essentially required that all of those items be simultaneously employed. That is, it is possible to select and employ only a portion (one, two, . . . , but not all) of those items.

(1) According to a first feature of the present invention, there is provided a method of detecting an edge of an object, comprising the steps of lighting, in each one of a plurality of different directions, at least a portion of the object, taking an image of the portion of the object and a vicinity of the portion which are lighted in the each one of the different directions, synthesizing the respective images of the portion of the object taken by lighting the portion in the different directions, and detecting, based on the synthesized images, an edge of the portion of the object.

Between a front-surface image of an object and an image of a portion of a vicinity of the object that is not lighted by a testing light, that is, an image of a shadowed portion of the vicinity, there is usually a significant difference in optical characteristic (e.g., luminance or hue). Therefore, if the front-surface image of the object and the image of the shadowed portion of the vicinity are simultaneously taken, it is possible to accurately detect, by lighting the front surface of the object and taking the front-surface image of the object, a portion of an edge of the object that corresponds to the shadowed portion of the vicinity (i.e., a portion of the edge that defines a bound between the object and the shadowed portion). However, to this end, it is needed to light the object in a direction inclined relative to a normal of an object's surface whose edge is to be detected, and accordingly only a portion of the vicinity of the object located on one side of the object' surface is shadowed. Hence, in the present embodiment, an object is lighted in each selected one of a plurality of different directions, an image of the object and the shadowed portion of the vicinity in that state is taken, and the respective images taken by lighting the object in the different directions are synthesized. Thus, an edge of a predetermined portion of the object can be detected. For example, in the case where an object's surface whose edge is to be detected is a rectangular surface, when the object is lighted in each one of two directions which are, in a plane which contains one of two diagonal lines of the rectangular surface and is perpendicular to the surface, inclined with respect to the one diagonal line such that the two directions have respective components each of which is parallel to the one diagonal line and which are opposite to each other, an entire edge of the rectangular surface that correspond to the four sides of the rectangle can be detected. In addition, in the case where a front surface of an object has at least one step, each image of the object and the vicinity thereof may include a plurality of edges. In the latter case, too, any one of those edges of the object can be entirely detected by selecting appropriate directions in each of which the object is lighted.

(2) According to a second feature of the present invention that includes the first feature (1), the detecting step comprises detecting an entire edge of a surface of the object.

It is preferred that the above-indicated surface of the object be a plane surface. However, the above subject may be a moderate convex or concave surface. That is, the above subject may be any surface which is bounded by a clear edge.

(3) According to a third feature of the present invention that includes the second feature (2), the surface is a rectangular surface, the different directions comprise two first directions which are, in a plane which contains one of two diagonal lines of the rectangular surface and is perpendicular to the surface, inclined with respect to the one diagonal line such that the two first directions have respective components each of which is parallel to the one diagonal line and which are opposite to each other, or two second directions which are near to the two first directions, respectively, and the taking step comprises taking an image of the portion of the object and a vicinity of the portion which are lighted in each one of the first or second directions.

It is preferred that the lighting directions in each of which the object is lighted be the two first directions contained in the plane perpendicular to the rectangular surface. However, the lighting directions may be the two second directions which are inclined by respective small angles relative to that plane.

(4) According to a fourth feature of the present invention that includes any one of the first to third features (1) to (3), the object comprises an electric component.

An image of an electric component may be taken in a state in which the component is supported on a support surface (the support surface preferably has a dark color, such as blue, brown, or black), or otherwise in a state in which the component is sucked and held by an end of a suction nozzle. In the latter case, it is preferred to provide the suction nozzle with a back plate having a dark surface defining a background of the component held by the nozzle.

(5) According to a fifth feature of the present invention, there is provided an apparatus for detecting an edge of an object, comprising a plurality of lighting devices each one of which lights, in a corresponding one of a plurality of different directions, at least a portion of the object; an image taking device which takes an image of the portion of the object and a vicinity of the portion which are lighted by the each one of the lighting devices in the one of the different directions; a control device which controls the lighting devices and the image taking device such that the each one of the lighting devices lights the portion of the object in the one of the different directions and the image taking device takes the image of the portion of the object and the vicinity of the portion lighted by the each one lighting device in the one direction; and an image-data processing device which processes a plurality of batches of image data representing the respective images taken by the image taking device from the portion of the object lighted by the each one of the lighting devices in the one of the different directions, and detects an edge of the portion of the object.

The present edge detecting apparatus can advantageously perform the edge detecting method according to the first feature (1). Since the control device automatically controls the selection of each of the lighting devices and the image taking operations of the image taking device, a plurality of images of the object and the vanity can be taken easily and quickly. In addition, since the image-data processing device automatically detects, based on the taken images, an edge of the object, the edge can be detected quickly and accurately.

(6) According to a sixth feature of the present invention that includes the fifth feature (5), the edge detecting apparatus further comprises an object holder which holds the object, the lighting devices are provided around the object holder such that the lighting devices are equiangularly spaced from each other about the object holder, and the image-data processing device detects an entire edge of a surface of the object held by the object holder.

(7) According to a seventh feature of the present invention that includes the sixth feature (6), the lighting devices are provided on a part-spherical concave surface whose center is located on a centerline of the object holder.

Since the plurality of lighting devices are provided on the part-spherical concave surface, not only an azimuth angle but also an elevation angle of each direction in which the object is lighted can be changed by selecting an appropriate one or more of the lighting devices. Therefore, in the case where the front surface of the object has at least one step, an edge of a surface of any step of the object can be easily detected.

(8) According to an eighth feature of the present invention that includes the sixth or seventh feature (6) or (7), the object holder comprises a holding head including a suction nozzle which sucks and holds the object, and a back plate which has a dark surface providing a dark background of the suction nozzle.

(9) According to a ninth feature of the present invention that includes any one of the sixth to eighth features (6) to (8), the object holder comprises a support member having a support surface which supports a lower portion of the object.

Since the object is supported by the support surface of the support member, a shadow of the object is surely formed on the support surface. It is preferred that the support surface have a dark color.

(10) According to a tenth feature of the present invention that includes any one of the fifth to ninth features (5) to (9), each of the lighting devices comprises at least one light emitting element.

Each lighting device may be one which employs a single light emitting element, or one which employs a plurality of light emitting elements. Each light emitting element may be a light emitting diode.

(11) According to an eleventh feature of the present invention that includes the tenth feature (10), the plurality of lighting devices comprise a number of light emitting elements which are substantially uniformly distributed on a surface and are divided into a plurality of areas each one of which comprises at least two light emitting elements and provides a corresponding one of the lighting devices.

(12) According to a twelfth feature of the present invention that includes the eleventh feature (11), the light emitting elements belonging to the each one of the areas are permanently unchangeable.

In this case, each one of the lighting devices can be easily selected, and a drive circuit associated with each light emitting element can be simplified.

(13) According to a thirteenth feature of the present invention that includes the eleventh feature (11), the light emitting elements belonging to the each one of the areas are changeable.

According to this feature, a group of light emitting elements belonging to each one of the lighting devices are temporary, and a portion (one, two, . . . , but not all) of the light emitting elements belonging to one lighting device may be replaced with a portion of the light emitting elements belonging to another lighting device. Thus, though each lighting device is provided by a plurality of light emitting elements, the direction in which the each lighting device lights the object can be finely changed.

(14) According to a fourteenth feature of the present invention that includes the fifth to thirteen features (5) to (13), the control device comprises a program memory which stores at least one lighting-and-image-taking controlling program to control the lighting devices and the image taking device; and a processor which implements the lighting-and-image-taking controlling program stored in the program memory.

(15) According to a fifteenth feature of the present invention that includes the fourteenth feature (14), the program memory stores a plurality of different lighting-and-image-taking controlling programs, and the control device further comprises a program selecting means for selecting one of the lighting-and-image-taking controlling programs stored in the program memory.

According to this feature, the directions in which the object is lighted and/or the number of image taking operations can be easily changed depending upon a sort of object.

(16) According to a sixteenth feature of the present invention that includes the fourteenth or fifteenth feature (14) or (15), the image-data processing device comprises a plurality of image buffers each of which stores a corresponding one of the batches of image data representing the respective images taken by the image taking device; and a synthesizing means for synthesizing, based on the batches of image data stored in the image buffers, the respective images taken by the image taking device.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF PREFERRED EMBODIMENTS

Figure 1:
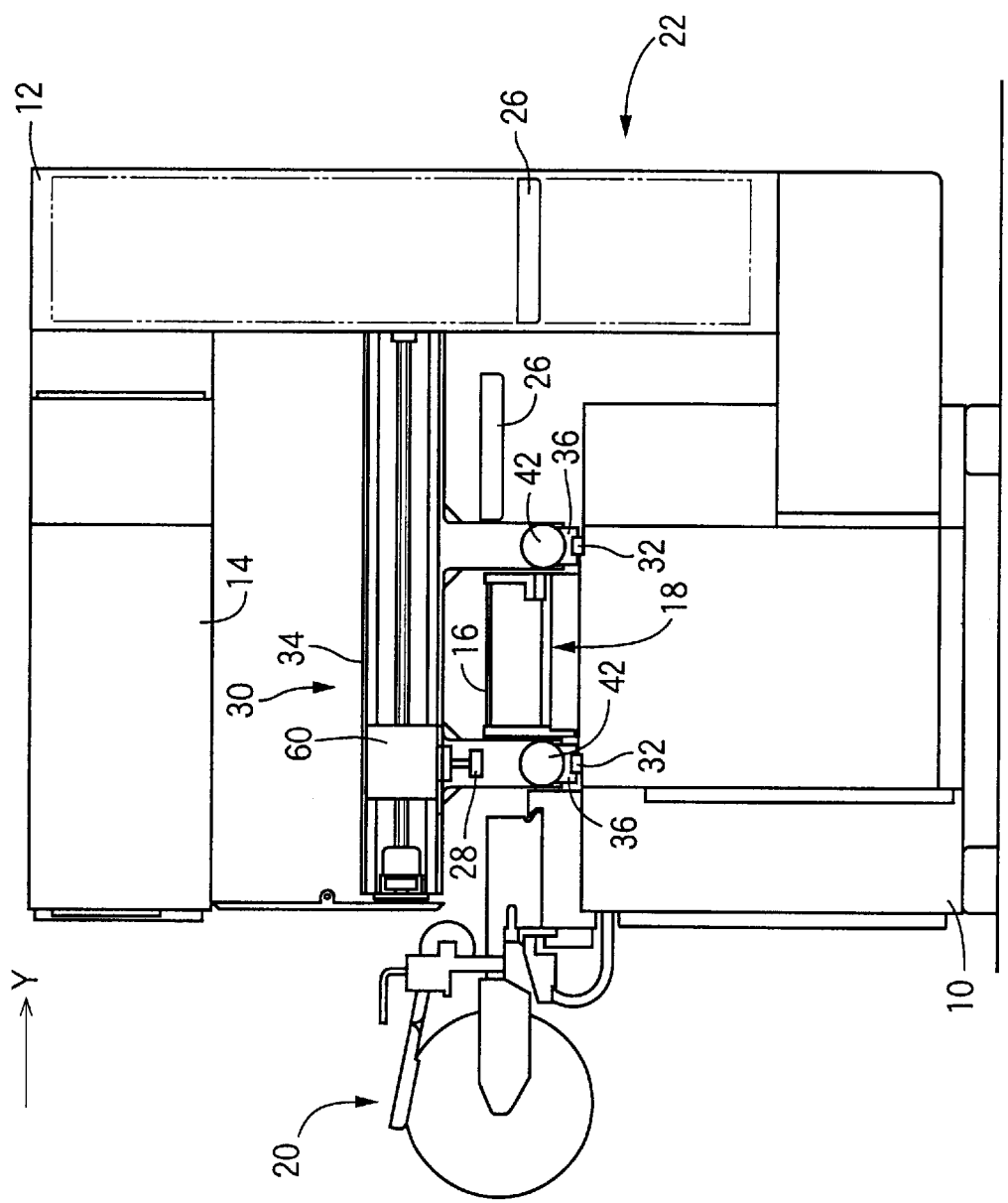
FIG. 1 is a front elevation view of an electric-component mounting system which carries out an edge detecting method to which the present invention is applied.
Figure 2:
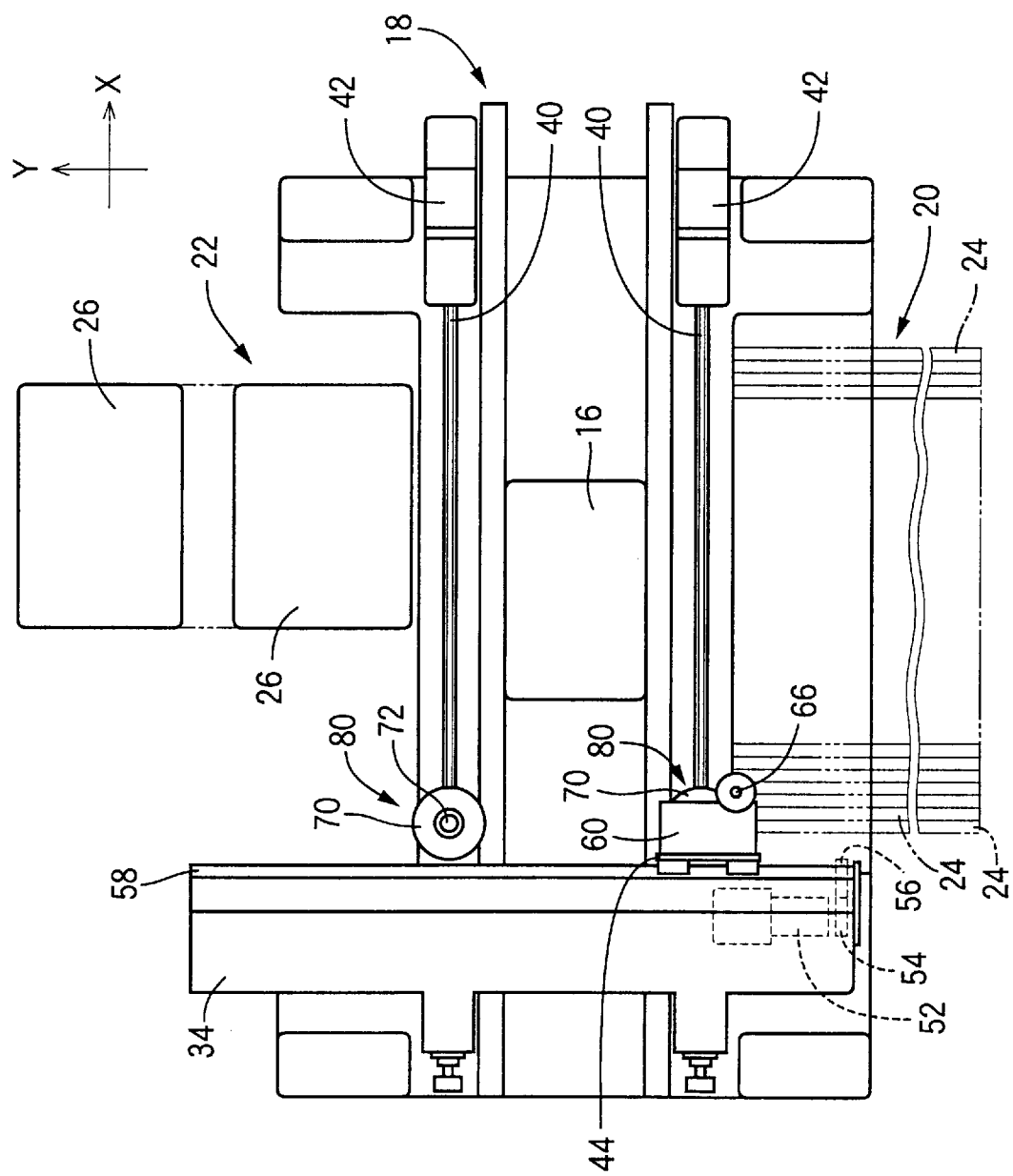
FIG. 2 is a plan view of the electric-component mounting system.

An electric-component (EC) mounting system to which the present invention is applied is shown in FIGS. 1 and 2. The present EC mounting system has the same basic construction as that of the system disclosed in Japanese Patent Document No. 6-291490. First, a general construction of the EC mounting system is briefly described and then, only relevant portions of the same are described in detail.

Figure 3:
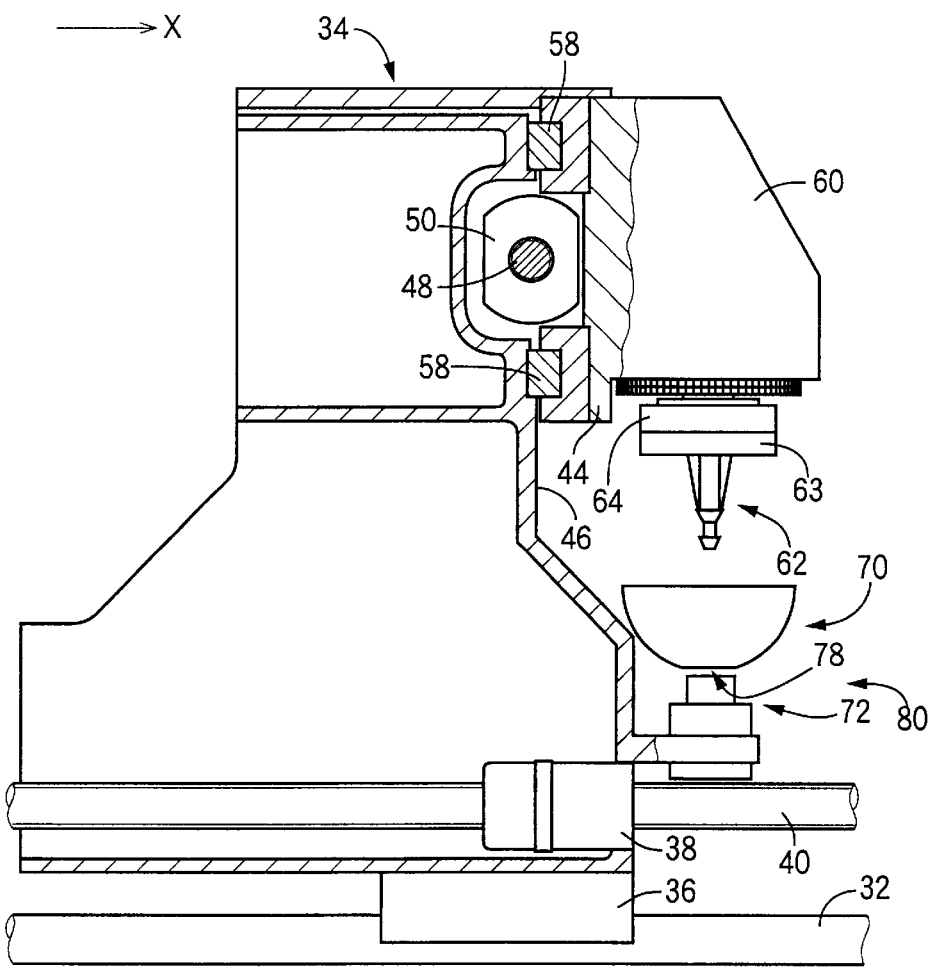
FIG. 3 is a cross-sectioned, side elevation view of a relevant portion of the mounting system.

In FIG. 1, reference numeral 10 designates a bed, on which a plurality of columns 12 stand. A stationary frame 14 is fixed to the columns 12, and supports an operation panel, etc. As shown in FIG. 2, on the bed 10, there is also provided a board conveyor 18 which conveys a printed board 16 as a substrate in an X-axis direction (i.e., leftward and rightward directions as seen in FIGS. 2 and 3). The term "printed board" is used to refer to both a printed "wiring" board on which no ECs have been mounted, and a printed "circuit" board on which ECs have been mounted. The printed board 16 which is conveyed by the board conveyor 18 is positioned and supported at a prescribed position by a board positioning and supporting device, not shown.

A feeder-type EC supplying device 20 and a tray-type EC supplying device 22 are provided on both sides of the board conveyor 18 in a Y-axis direction perpendicular to the X-axis direction on a horizontal plane. The feeder-type EC supplying device 20 includes a number of feeders 24 which are arranged in the X-axis direction. Each feeder 24 feeds an EC carrier tape. The EC carrier tape includes an EC accommodating tape which has a number of EC accommodating pockets arranged at a regular interval of distance in a lengthwise direction thereof and carries a number of ECs accommodated in the pockets, respectively; and a cover tape which is adhered to the accommodating tape to close respective openings of the pockets thereof, so that at the time of feeding of the EC carrier tape, the ECs are prevented from jumping out of the pockets. Each feeder 24 feeds the EC carrier tape at a predetermined pitch in the Y-axis direction, while peeling the cover tape from the EC accommodating tape. Thus, each EC is fed to an EC-supply portion of each feeder 24 as an EC-supply position of the feeder-type EC supplying device 20.

The tray-type EC supplying device 22 includes a number of trays each of which holds a plurality of ECs. As shown in FIG. 2, the supplying device 24 includes a number of tray accommodating boxes 26 each of which accommodates a plurality of trays. The tray accommodating boxes 26 are supported by respective support members, not shown, and are sequentially moved to a prescribed EC-supply position by an elevating and lowering device and a moving device, both not shown, which are provided in one of the columns 12. The EC-supply position is prescribed at a position which is nearer to the board conveyor 18 than a waiting position where the boxes 26 wait in a vertically stacked state. Above one box 26 being positioned at the EC-supply position, a predetermined head-movement space is provided for a mounting head 60, described later, to move and take ECs from the trays of the one box 26. One box 26 which accommodates one tray storing one or more ECs to be supplied next, is moved in a horizontal direction from the waiting position to the EC-supply position where the one box 26 supplies the EC or ECs. After the one box 26 has finished supplying the EC or ECs, the one box 26 is returned horizontally to the waiting position, before the next box 26 is moved to the EC-supply position, and then is retracted (i.e., moved upward) to a waiting space which is provided above the waiting position.

ECs 28 (FIG. 1) which are supplied by the feeder-type EC supplying device 20 and/or the tray-type EC supplying device 22 are mounted on the printed board 16 by an EC mounting device 30 which is provided on the bed 10. As shown in FIG. 1, two guide rails 32 which extend in the X-axis direction are provided, on the bed 10, on both sides of the board conveyor 18 in the Y-axis direction, and an X-axis slide 34 fits on the guide rails 32 via respective guide blocks 36 such that the X-axis slide 34 is movable in the X-axis direction.

As shown in FIG. 2, the X-axis slide 34 has a length extending from the feeder-type EC supplying device 20 to the tray-type device 22 over the board conveyor 18, and two nuts 38 (only one nut 28 is shown in FIG. 3) are fixed to the X-axis slide 34. The two nuts 38 are threadedly engaged with two ball screws 40, respectively. When the two ball screws 40 are rotated in synchronism with each other by two X-axis servomotors 42, respectively, the X-axis slide 34 is moved in the X-axis direction.

On the X-axis slide 34, a Y-axis slide 44 is provided such that the Y-axis slide 44 is movable in the Y-axis direction perpendicular to the X-axis direction on the horizontal plane. As shown in FIG. 3, the X-axis slide 34 has a vertical surface 46 to which a ball screw 48 which extends in the Y-axis direction is fixed, and a nut 50 fixed to the Y-axis slide 44 is threadedly engaged with the ball screw 48. When the ball screw 48 is rotated by a Y-axis servomotor 52, shown in FIG. 2, via gears 54, 56, the Y-axis slide 44 is moved in the Y-axis direction by being guided by a pair of guide rails 58.

As shown in FIG. 3, the Y-axis slide 44 supports a mounting head 60 such that the head 60 is not movable relative to the Y-axis slide 44. The mounting head 60 includes a nozzle holder 64 which is vertically movable, and rotatable, and a suction nozzle 62 is attached to the holder 64 such that the nozzle 62 is detachable from the holder 64. The suction nozzle 62 applies a negative-pressure air to an EC 28 and thereby holds the same 28. The suction nozzle 62 includes a back plate 63 having a dark surface providing a dark background of the EC 28 held by the nozzle 62. The mounting head 60 additionally supports a fiducial-mark (F-mark) camera 66 (FIG. 2) which takes respective images of fiducial marks (F-marks) as positioning reference marks provided on the printed board 16, in such a manner that the F-mark camera 66 is not movable relative to the head 60. The F-mark camera 66 is a CCD (charge-coupled device) camera including a matrix of CCDs defining an image-take surface.

As shown in FIGS. 2 and 3, two lighting devices 70, and two EC cameras 72 each as an image taking device are fixed to the X-axis slide 34. One of the two lighting devices 70 and one of the two EC cameras 72 are provided between the feeder-type EC supplying device 20 and the board conveyor 18; and the other lighting device 70 and the other EC camera 72 are provided between the tray-type EC supplying device 22 and the board conveyor 18. Respective brackets for fixing the two lighting devices 70 to the X-axis slide 34 are not shown for easier understanding purposes only. The one lighting device 70 and the one EC camera 72 are provided on a portion of the X-axis slide 34 between the feeder-type EC supplying device 20 and the board conveyor 18; and the other lighting device 70 and the other EC camera 72 are provided on another portion of the X-axis slide 34 between the tray-type EC supplying device 22 and the board conveyor 18.

Figure 4:
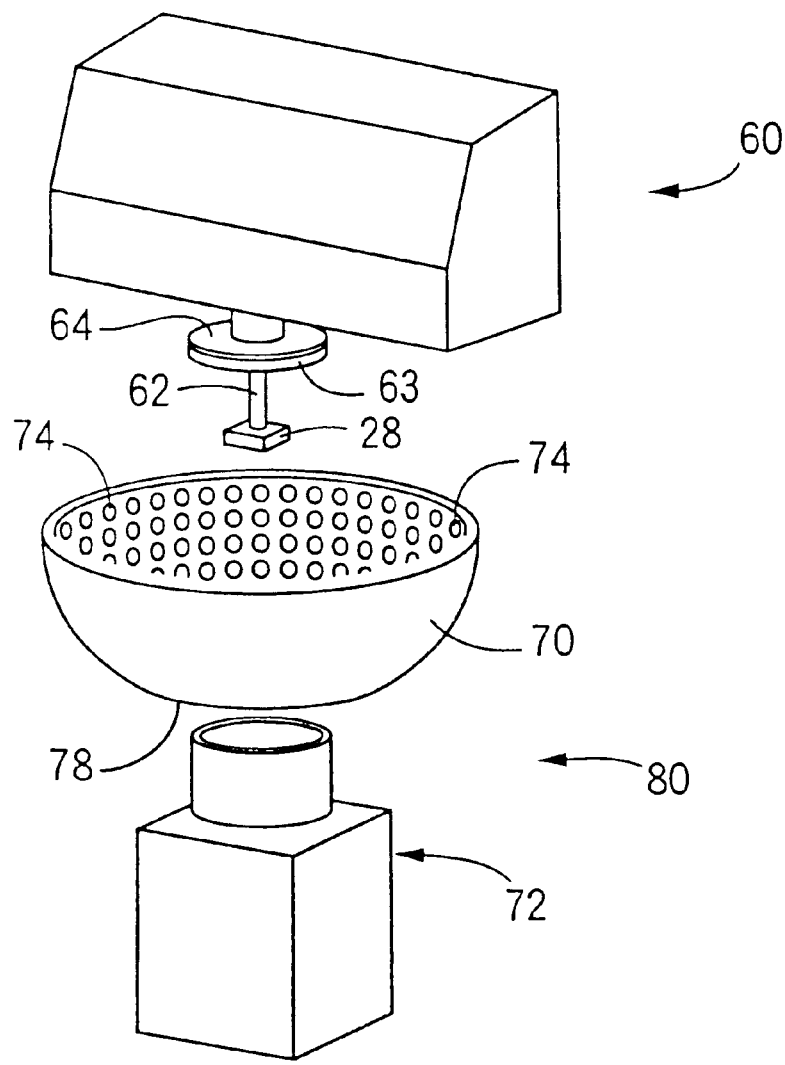
FIG. 4 is an enlarged view of the relevant portion shown in FIG. 3.

As shown in FIG. 4, each of the two lighting devices 70 has a hollow hemispherical shape, and opens upward. Each of the two lighting devices 70 is provided such that a center of a circle defined by the upper open end of the hollow hemisphere is located above a corresponding one of the two EC cameras 72. A number of light emitting diodes (LEDs) 74 are provided on an inner surface of the hollow hemisphere such that the LEDs 74 are substantially uniformly distributed over the inner surface. Those LEDs 74 are divided, in advance, into a plurality of lighting areas, which are connected to a plurality of switches 76 (FIG. 5), respectively, so that all the LEDs 74 of each of the lighting areas are simultaneously turned on and off, independent of the LEDs 74 of the other lighting area or areas. In the present embodiment, each lighting area is a small strip-like area having a wide elevation angle, and a narrow azimuth angle, as viewed from the EC 28 held by the suction nozzle 62. More specifically described, each lighting area include five LEDs 74 in its wide elevation angle and two LEDs 74 in its narrow azimuth angle, i.e., ten LEDs 74 in total. Thus, the ten LEDs 74 cooperate with one another to provide one lighting unit which is connected to one switch 76.

Since each lighting device 70 opens upward as described above, the inner surface of the hollow hemisphere faces the EC 28 as an object whose image is to be taken. Each lighting device 70 as the light source has, in a bottom thereof, a circular aperture 78. Below each of the two lighting devices 70, a corresponding one of the two EC cameras 72 is provided such that the one EC camera 72 is oriented in a vertically upward direction, so that the one EC camera 72 can take an image of the EC 28 positioned above the each lighting device 70 through the aperture 78. Each of the two EC cameras 72 is provided by a CCD camera, and cooperates with a corresponding one of the two lighting devices 70 to provide a lighting and image-taking device 80 which takes an image of the EC 28.

Figure 5:
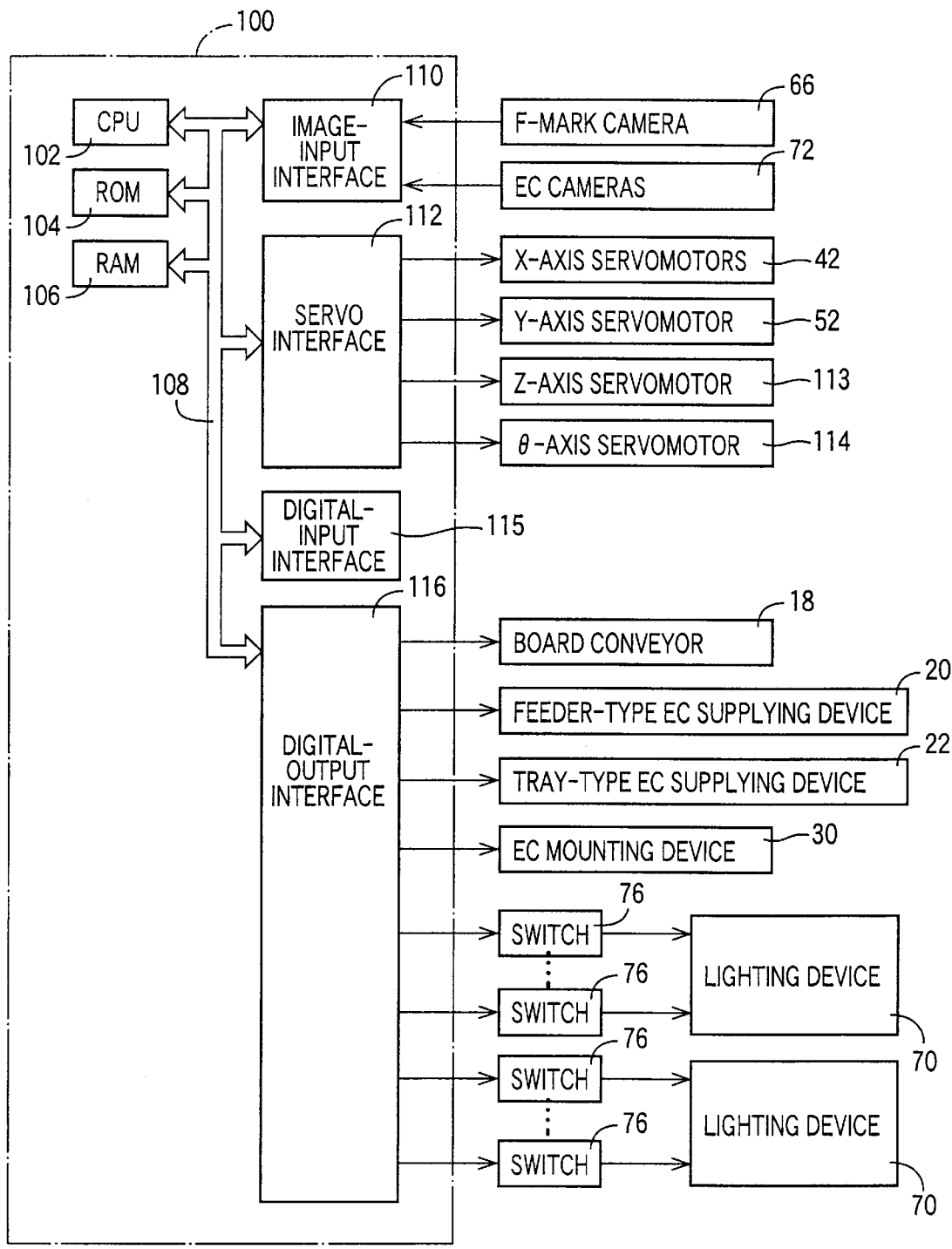
FIG. 5 is a diagrammatic view of a control device of the mounting system.

The present EC mounting system includes a control device 100 shown in FIG. 5. The control device 100 is essentially provided by a computer including a central processing unit (CPU) 102, a read only memory (ROM) 104, a random access memory (RAM) 106, and a bus 108 which couples those elements 102, 104, 106 to one another. An image-input interface 110 is coupled to the bus 118, and the F-mark camera 66 and the two EC cameras 72 are connected to the image-input interface 110. A servo interface 112 is also coupled to the bus 108, and the X-axis servomotors 42, the Y-axis servomotor 52, a Z-axis servomotor 113 which elevates and lowers the nozzle holder 64 and the suction nozzle 62, and a θ-axis servomotor 114 which rotates the holder 64 and the nozzle 62 are connected to the servo interface 112. In addition, a digital-input interface 115 and a digital-output interface 116 are also coupled to the bus 108, and the board conveyor 18, the feeder-type and tray-type EC supplying devices 20, 22, and the other portions of the EC mounting device 30 than the above-described servomotors are connected to the digital-output interface 116. Moreover, the lighting devices 70 are connected to the interface 116 via the switches 70.

The ROM 104 stores various control programs including an EC mounting program which is used by the computer to mount the ECs 28 on the printed board 16, and an image processing program which will be described later.

Next, the operation of the EC mounting system constructed as described above will be described. Since the EC mounting operation of the present system is described in detail in the above-indicated Japanese Patent Document No. 6-291490, the EC mounting operation is just briefly described, and an image processing operation of the present system are described in detail.

In the EC mounting operation, first, the X-axis slide 34 and/or the Y-axis slide 44 is/are moved to convey the mounting head 60 to the EC-supply position of the feeder-type or tray-type EC supplying device 20, 22 where the mounting head 60 or the suction nozzle 62 holds one EC 28 supplied by the supplying device 20, 22. After the suction nozzle 62 is lowered and is contacted with the EC 28 by an elevating and a lowering device which includes the Z-axis servomotor 113 as its drive source, a negative-pressure air is supplied to the nozzle 62 so that the nozzle 62 sucks and holds the EC 28 and subsequently the nozzle 62 is moved upward.

The mounting head 60 or the suction nozzle 62 holding the EC 28 is moved, along a straight line connecting between the EC-supply position of the feeder-type or tray-type EC supplying device 20 or 22 and a prescribed EC-mount place on the printed board 16, from the EC-supply position toward the EC-mount place. During this movement, the mounting head 60 is stopped at a position above either one of the two lighting and image-taking devices 80 that is fixed to a portion of the X-axis slide 34 between the EC-supply position and the EC-mount place. Wherever the EC-supply position may be on the feeder-type or tray-type EC supplying device 20, 22, or wherever the EC-mount place may be on the printed board 16, the mounting head 60 must move in the Y-axis direction on the X-axis slide 34 and pass over, for moving from the EC-supply position to the EC-mount place, one of the two lighting and image-taking devices 80. Therefore, the mounting head 60 is stopped at the position above the one lighting and image-taking device 80.

At that time, the control device 100 selects, according to the image processing program stored in the ROM 104, appropriate ones of the LEDs 74 of the lighting device 70 of the above-indicated one lighting and image-taking device 80, operates the selected LEDs 74 to emit light toward the EC 28 held by the suction nozzle 62, and operates the EC camera 72 of the one device 80 to take an image of a front surface of the EC 28 and a vicinity of the EC 28 each time appropriate LEDs 74 are selected and operated to emit light toward the EC 28. After all image taking operations have been finished on one EC 28, the mounting head 60 is moved to the EC-mount position where the EC 28 held thereby is mounted on the printed board 16. During this movement of the mounting head 60, the control device 100 processes batches of image data representing the images taken from the EC 28, and detects an edge of the EC 28. Moreover, the control device 100 determines, based on the detected edge of the EC 28, one or more positional errors of the EC 28 relative to the suction nozzle 62, then operates, based on the determined positional errors of the EC 28, the θ-axis servomotor 114 to rotate the nozzle holder 64, and the X-axis and Y-axis servomotors 42, 52 to move the mounting head 60, so that the EC 28 held by the nozzle 62 is accurately mounted at the EC-mount position on the printed board 16. Next, there will be described the operations of the EC mounting system according to the image processing program.

Figure 6:
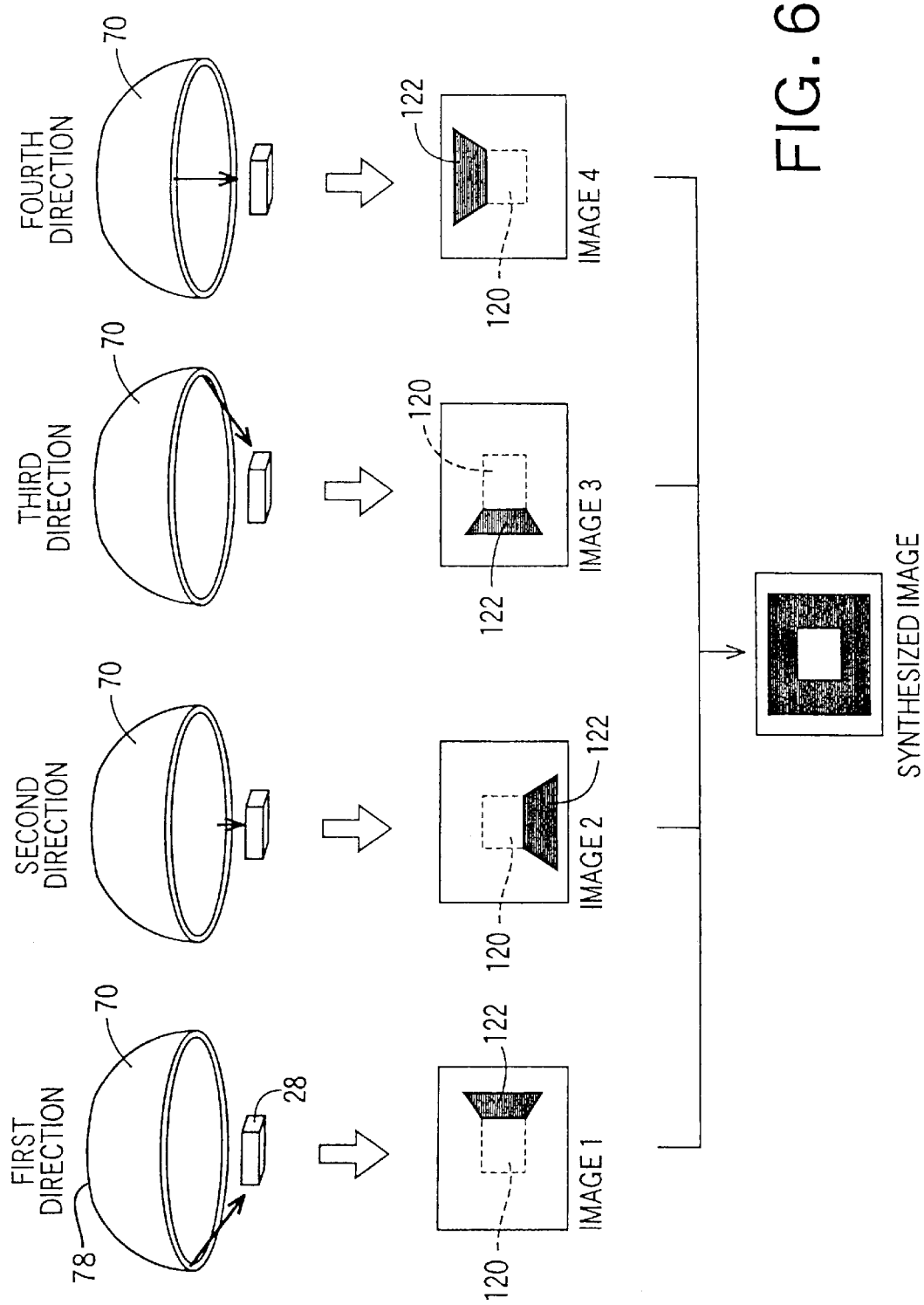
FIG. 6 is a view for explaining a manner in which the mounting system takes an image and processes image data.

All the LEDs 74 of each of the two lighting devices 70 are divided into a plurality of predetermined lighting areas, depending upon the EC 28 held by the suction nozzle 62. As shown in FIG. 6, the control device 100 sequentially operates the LEDs 74 of each one of the predetermined lighting areas to emit light toward the EC 28. FIG. 6 shows the EC 28 and the lighting device 70, upside down, for easier understanding purposes only. The image processing program includes, for a sort and/or a shape of each EC 28, control data to divide the LEDs 74 into a plurality of predetermined lighting areas and operate the lighting areas to sequentially emit light in a predetermined order. In the present embodiment, since the EC 28 has a rectangular surface, the LEDs 74 are divided into four lighting areas each of which lights the EC 28 in a corresponding one of four directions which are perpendicular to the four sides of the rectangular surface, respectively. When a first one of the four lighting areas is operated to emit light, a shadow of the EC 28 is formed in a portion of a vicinity of the EC 28 that is located on one side thereof opposite to the first lighting area, so that the EC camera 72 takes an image 120 of the EC 28 and an image 122 of the shadowed portion of the vicinity of the EC 28. In FIG. 6, the image 120 of the EC 28 is indicated at broken line, because an image of the other portion of the vicinity of the EC 28 than the shadowed portion may be light and a bound between that image and the image 120 of the EC 28 may be unclear. Thus, the image 122 of the shadowed portion is significantly dark as compared with the image 120 of the EC 28 and the image of the other portion of the vicinity of the same 28. A batch of image data representing the thus taken image including the images 120, 122 is stored in one frame buffer of the RAM 106 of the computer. Then, likewise, a second, a third, and a fourth lighting area are sequentially operated to emit light toward the EC 28, so that the EC camera 72 takes an image of the EC 28 which is lighted by each one of the second, third, and fourth lighting areas, and respective batches of image data representing the thus taken images are stored in respective frame buffers of the RAM 106.

Next, the four batches of image data are superposed on one another to produce a single synthesized image. In the present embodiment, since the EC 28 and the EC camera 72 are not moved relative to each other while the four images of the EC 28 are taken, a synthesized image can be easily produced by simply superposing the four images on one another. In fact, as illustrated in the bottom portion of FIG. 6, a synthesized image is produced which includes (i) a dark image as a set of four shadowed-portion images 122 obtained by the four image-taking operations, and (ii) a light image of the rectangular surface of the EC 28 that is surrounded by the dark image. A bound between the dark image and the light image is detected as an entire edge of the rectangular surface of the EC 28 and, based on the detected edge of the EC 28, positional errors (e.g., a rotation-position error and two center-position errors) of the EC 28 relative to the suction nozzle 62 are determined. The rotation-position error is an error of a rotation or angular error of the EC 28 relative to the nozzle 62 about an axis line of the nozzle 62; and the two center-position errors are respective errors of a predetermined center position of the EC 28 relative to the nozzle 62 in the X-axis and Y-axis directions. Based on the thus determined positional errors of the EC 28, the control device 100 controls the θ-axis servomotor 114 as the drive source of the rotating device to rotate the nozzle holder 64 and the suction nozzle 62 to correct the rotation-position error, and controls the X-axis and Y-axis servomotors 42, 52 to move the mounting head 60 to correct the center-position errors, so that the EC 28 is accurately mounted on the printed board 16.

Figure 7:
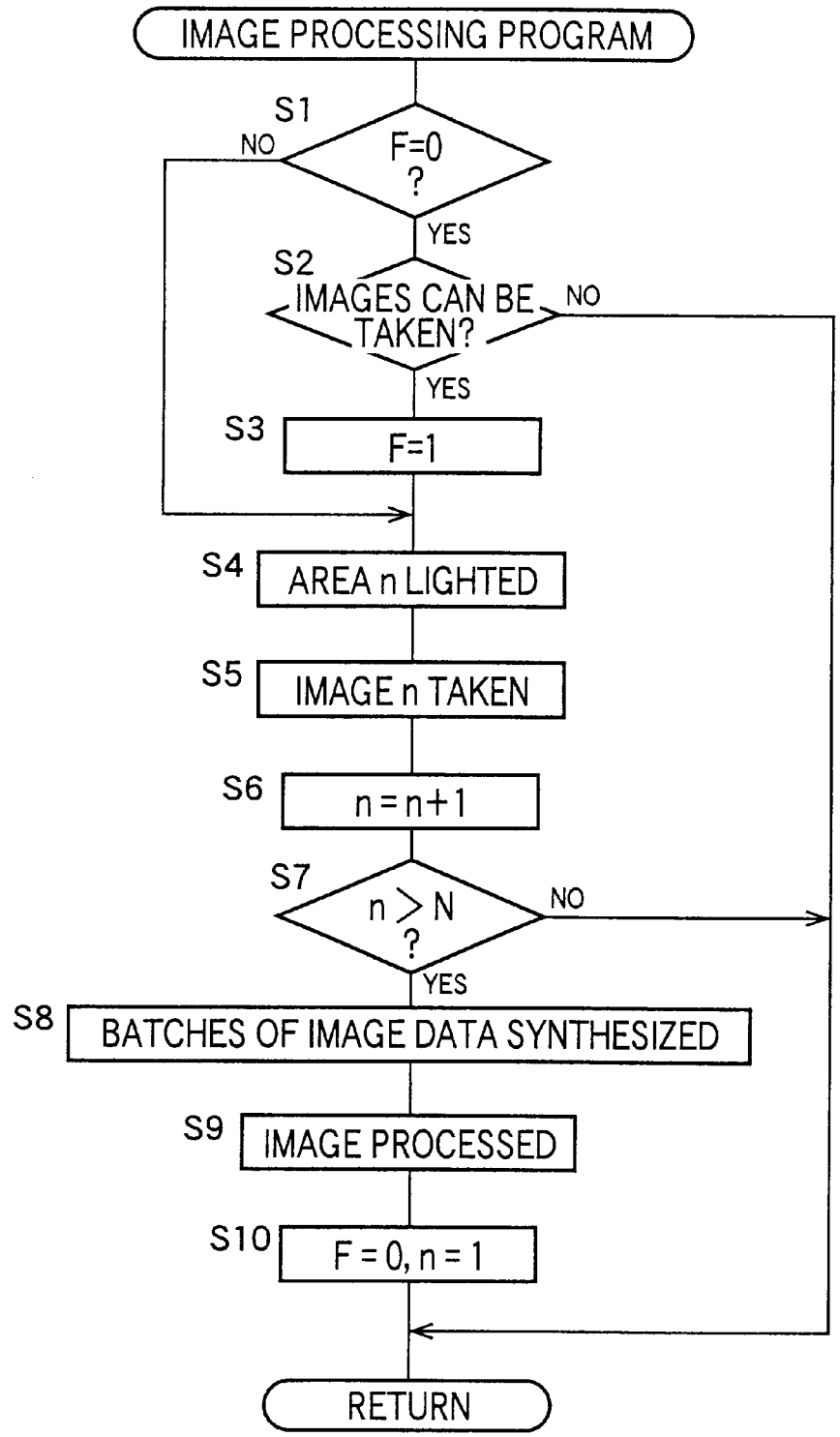
FIG. 7 is a flow chart representing an image-data processing program which is carried out by the mounting system.

Next, the image processing program will be described by reference to the flow chart of FIG. 7. This program is iteratively carried out during the operation of the EC mounting system.

First, at Step S1 (hereinafter, simply referred to as S1; this applies to the other steps), the control device 100 judges whether Flag, F, is set at F=0. In a first control cycle according to this program, Flag F remains at F=0 and accordingly a positive judgment is made at S1. Then, the control goes to S2 to judge whether an image of the EC 28 can be taken by the EC camera 72. In the present embodiment, in a state in which the mounting head 60 is stopped at the position right above either one of the two lighting and image-taking devices 80, a stop signal is produced and, when the stop signal is produced, the control device 100 judges that an image of the EC 28 can be taken. If no stop signal is produced, a negative judgment is made at S2, and the current control cycle according to this program is terminated. On the other hand, if the stop signal is produced, the control proceeds with S3 to change Flag F to F=1. In each of subsequent control cycles according to this program, S2 and S3 are skipped until all the operations for the current EC 28 are finished.

Next, at S4, the control device 100 operates a lighting area, n (=1, 2, 3, or 4), of the above-explained predetermined lighting areas that corresponds to a sequential number, n, to emit light. In the current control cycle, the sequential number n is equal to an initial value, i.e., 1. Thus, the first lighting area is operated to emit light toward the EC 28 and, at S5, the EC camera 72 is operated to take an image of the EC 28 and a vicinity thereof. A batch of image data representing the thus taken image is stored in a frame buffer of the RAM 106 corresponds to the sequential number n=1. At S6, the control device 100 adds one to the current sequential number n, thereby updating the number n. At S7, the control device 100 judges whether the sequential number n is greater than a total number, N, of all the lighting areas. In the present embodiment, the LEDs 74 of each lighting device 70 is divided into four lighting areas, the total number N is equal to 4. Therefore, if S4, S5 and S6 are repeated four times, all the image taking operations are finished and a positive judgment is made at S7. Then, at S8, the control device 100 synthesizes the four batches of image data representing the thus taken four images, and produces a synthesized image as shown in FIG. 6. At S9, the control device 100 processes the thus obtained synthesized image. More specifically described, the control device 100 detects an entire edge of a rectangular top surface of the EC 28, determines, based on the thus detected edge, rotation-position and center-position errors of the EC 28 relative to the suction nozzle 62, and produces, based on the thus determined errors, correct rotation data indicative of a correct rotation angle by which the nozzle 62 is rotated, and correct movement data indicative of respective movement amounts by which the mounting head 60 is moved in the X-axis and Y-axis directions. Then, at S10, Flag F and sequential number n are reset to their initial values, i.e., F=0 and n=0, respectively. Thus, all the operations for one EC 28 are finished.

It emerges from the foregoing description that in the present embodiment, the suction nozzle 62 provides an object holder which holds an object; the plurality of lighting areas of each of the two lighting devices 70 provide a plurality of lighting devices each of which lights the object in a corresponding one of a plurality of different directions; each of the two EC cameras 72 provides an image taking device; a portion of the control device 100 that carries out S1 to S7 of the image processing program provides a control device which controls the lighting devices and the image taking device; and a portion of the control device 100 that carries out S8 to S10 of the image processing program provides an image-data processing device which processes a plurality of batches of image data representing the respective images taken by the image taking device. In the present embodiment, each of the two lighting devices 70 includes many LEDs 74 and accordingly functions as four lighting devices each of which lights the EC 28 as the object in a corresponding one of the four directions.

In the present embodiment, each of the two lighting and image-taking devices 80 can light a front surface of the EC 28 and take a front-surface image of the same 28, and the control device 100 can detect, based on the thus taken front-surface image, a clear edge of the EC 28. Thus, the accuracy of determination of a dimension and/or a position of the EC 28 can be sufficiently improved. Moreover, since the front surface of the EC 28 is lighted, the degree of freedom of the lighting device 70 is not lowered.

In the present embodiment, each of the two lighting devices 70 emits light directly from the LEDs 74 toward the EC 28. However, the LEDs 74 may be covered with a diffusion plate so that a relatively uniform light is emitted from the diffusion plate toward the EC 28. In addition, the each lighting device 70 may be replaced with one which includes a plurality of light emitting devices each of which has a point light source which radiates light from a point, and an optical system, including a lens, which converts the light into parallel rays.

In the present embodiment, each of the divided areas of each lighting device has a shape which has a wide elevation angle and a narrow azimuth angle. However, each divided area may have a different shape. For example, each divided area may have a shape which has a wide azimuth angle and a narrow elevation angle, or a shape having elevation and azimuth angles which are substantially equal to each other.

In the present embodiment, each of the lighting areas is provided by a corresponding one of the divided areas, and all the LEDs 74 belonging to each of the divided areas are connected to a common switch 76, so that all the LEDs 74 can be simultaneously turned on and off. However, the size of each divided area may be smaller than that of each lighting area, so that a plurality of divided areas can cooperate with each other to provide a lighting area. In the latter manner, if the way of combination of two or more divided areas can be changed, then the degree of freedom can be increased with respect to the selection of position and/or size of each lighting area. Moreover, the latter manner enjoys an advantage that each lighting device 70 enjoys a simpler construction than that of a lighting device which employs a plurality of LEDs each one of which is turned on and off, independent of the other LEDs. In the latter manner, each divided area may be provided by an array of LEDs 74 arranged in an elevation angle, an array of LEDs 74 arranged in an azimuth angle, or a matrix of LEDs 74 having a same number (e.g., two) of LEDs 74 in each of elevation and azimuth angles. It goes without saying that each of the two lighting devices 70 may be replaced with a lighting device which employs a plurality of LEDs each one of which is turned on and off, independent of the other LEDs.

In the present embodiment, the four lighting areas are so pre-determined as to emit light in the respective directions substantially perpendicular to the four sides of the rectangular top surface of the EC 28. However, the respective shapes and/or respective positions of the lighting areas, and/or the total number of the lighting areas may be changed. For example, in the present embodiment, the EC 28 having the rectangular top surface may be lighted by two lighting areas each of which emits light in a corresponding one of two directions which are, in a plane which contains one of two diagonal lines of the rectangular surface and is perpendicular to the surface, inclined with respect to the one diagonal line such that the two directions have respective components each of which is parallel to the one diagonal line and which are opposite to each other. In this case, when the EC 28 is lighted by each one of the two lighting areas in a corresponding one of the two directions, the EC camera 72 takes an image of two shadowed portions of vicinity of the EC 28 that correspond to two sides of the rectangular surface located on one side of the EC 28 opposite to the each one lighting area. Thus, the total number of image taking operations can be reduced. In this case, it is preferred that each lighting area have a narrow elevation angle and a wide azimuth angle.

The foregoing description relates to the EC 28 which has a simple parallelepiped shape and whose top rectangular surface substantially defines an outline thereof. However, in the present embodiment employing the lighting and image-taking devices 80, the control device 100 can detect an edge of an EC 28 having a cubic shape in which the edge is located inside an outline thereof for example, a package-type EC which is called PLCC (plastic leaded chip carrier) and which includes J-shaped leads projecting from side surfaces of a main body thereof such that respective end portions of the leads are located inside an outline of the main body.

Figure 8:
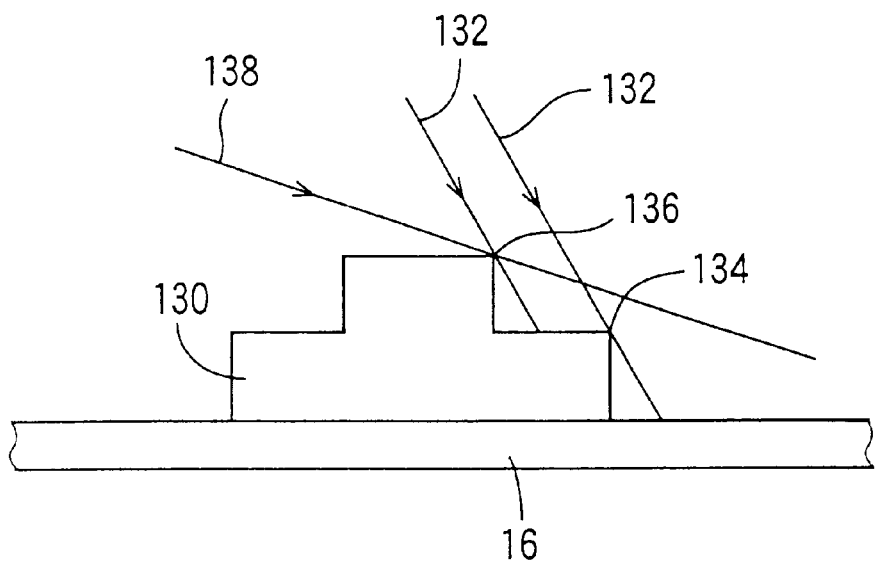
FIG. 8 is a view for explaining a direction in which a light is emitted to carry out another edge detecting method as another embodiment of the present invention.

FIG. 8 shows an object 130 (this object may, or may not, be an EC) which has a plurality of surfaces (e.g., two surfaces) whose edges are to be detected. An edge of any one of those surfaces of the object 130 can be detected by using the lighting and image-taking devices 80. An edge 134 of the lower surface of the object 130 can be detected by lighting the object 130 with parallel lights 132 emitted by LEDs 74 located in a lighting area having a great or high elevation angle as viewed from the object 130; and an edge 136 of the upper surface of the object 130 can be detected by lighting the object 130 with parallel lights 138 emitted by LEDs 74 located in a lighting area having a small or low elevation angle. The edge 136 of the upper surface may be detected by lighting the object 130 with the parallel lights 132 emitted by the lighting area having the high elevation angle. Thus, any desired edge of an object can be detected by selecting a lighting area having an appropriate elevation angle as viewed from the object 130. In this case, it is preferred that the elevation angle of each lighting area be narrow. The object 130 is placed on a support surface of a support member, not shown in FIG. 8. The support member may be the printed board 16 shown in FIG. 1. In this case, the F-mark camera 66 may be used to take an image of the object and a vicinity thereof, and a lighting device similar to the lighting devices 70 may be employed to light the object 130 supported by the support member.

It is to be understood that the present invention may be embodied with various other changes, modifications and improvements, such as those described in SUMMARY OF THE INVENTION, which may occur to a person skilled in the art without departing from the spirit and scope of the invention defined in the appended claims.

What is claimed is:

1. An apparatus for detecting an edge of a surface of an object, comprising:
    at least three light emitting elements which are provided at respective different positions;
    a control device which selects, from said at least three light emitting elements,
    at least two operative light emitting elements providing at least two lighting devices, respectively;
    each one of said at least two lighting devices lighting, in a corresponding one of at least two different directions which are inclined relative to a normal of said surface of the object and have different angular phases about said normal, said surface of the object while the object is not rotated;
    an image taking device which takes an image of said surface of the object and a vicinity of said surface which are lighted by said each one of the lighting devices in said one of the different directions while the object is not rotated;
    the control device controlling the lighting devices and the image taking device such that said each one of the lighting devices lights said surface of the object in said one of the different directions and the image taking device takes the image of said surface of the object and the vicinity of said surface lighted by said each one lighting device in said one direction; and
    an image-data processing device which processes a plurality of batches of image data representing the respective images taken by the image taking device from said surface of the object lighted by said each one of the lighting devices in said one of the different directions, and detects an edge of said surface of the object.

2. The apparatus according to claim 1, further comprising an object bolder which holds the object, wherein the control device selects, from said at least three light emitting elements, said at least two operative light emitting elements providing said at least two lighting devices, such that the lighting devices are provided around the object holder and are equi-angularly spaced from each other about the object holder, and wherein the image-data processing device detects an entire edge of said surface of the object held by the object holder.

3. The apparatus according to claim 2, wherein said at least three light emitting elements are provided on a part-spherical concave surface whose center is located on a centerline of the object holder.

4. An apparatus according to claim 2, wherein the object holder comprises a holding head including (a) a suction nozzle which sucks and holds the object, and (b) a back plate which has a dark surface providing a dark background of the suction nozzle.

5. An apparatus according to claim 2, wherein the object holder comprises a support member having a support surface which supports a lower portion of the object.

6. The apparatus according to claim 1, comprising at least four light emitting elements comprising said at least three light emitting elements, wherein the control device selects, from said at least four light emitting elements, at least four operative light emitting elements providing said at least two lighting devices, respectively, such that each of the lighting devices comprises at least two operative light emitting elements.

7. The apparatus according to claim 1, comprising at least four light emitting elements which comprise said at least three light emitting elements and are substantially uniformly distributed on at least one surface surrounding the object, wherein the control device divides said at least one surface surrounding the object into at least two areas, each one of said at least two areas comprising at least two operative light emitting elements and providing a corresponding one of said at least two lighting devices.

8. The apparatus according to claim 7, wherein the control device can change at least one of (a) a shape of each one of the areas, (b) a position of each one of the areas, and (c) a total number of the areas.

9. An apparatus according to claim 1, wherein the control device comprises:
    a program memory which stores at least one lighting-and-image-taking controlling program to control the lighting devices and the image taking device; and
    a processor which implements the lighting-and-image-taking controlling program stored in the program memory.

10. An apparatus according to claim 9, wherein the program memory stores a plurality of different lighting-and-image-taking controlling programs, and wherein the control device further comprises a program selecting means for selecting one of the lighting-and-image-taking controlling programs stored in the program memory.

11. An apparatus according to claim 9, wherein the image-data processing device comprises:
    a plurality of image buffers each of which stores a corresponding one of the batches of image data representing the respective images taken by the image taking device; and
    a synthesizing means for synthesizing, based on the batches of image data stored in the image buffers, the respective images taken by the image taking device.

12. The apparatus according to claim 1, wherein the control device selects, from said at least three light emitting elements, said at least two operative light emitting elements, depending upon at least one of a sort and a shape of the object.

13. The apparatus according to claim 1, wherein the image taking device takes an image of said surface of the object lighted by said each one of the lighting devices in said one of the different directions, and a shadow cast by the lighted surface.

* * * * *